Figure 1:
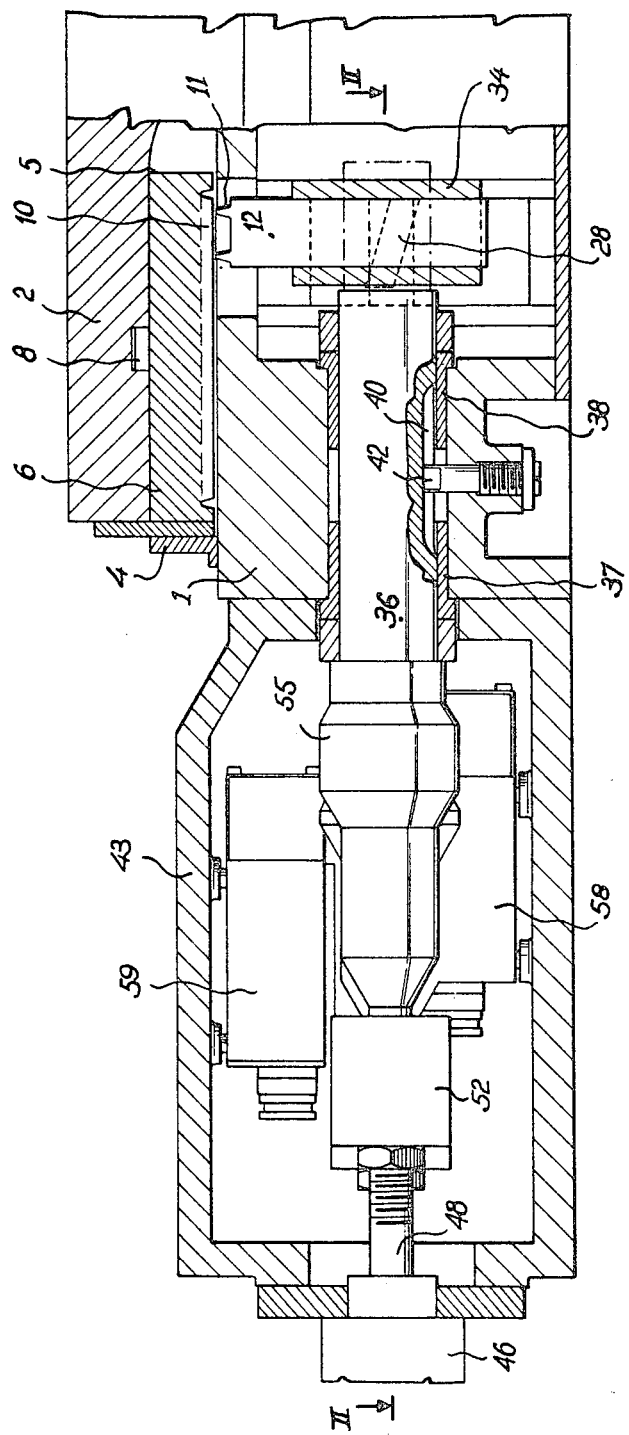

June 25, 1968

P. PORTAL ET AL 3,389,638

LINEAR DIVIDER

Filed April 29, 1966

4 Sheets-Sheet 1

INVENTORS
JACQUES ROUCHAUD
PIERRE PORTAL
BY
Bacon & Thomas
ATTORNEYS

June 25, 1968  P. PORTAL ETAL  3,389,638
LINEAR DIVIDER

Filed April 29, 1966  4 Sheets-Sheet 3

INVENTORS
JACQUES ROUCHAUD
PIERRE PORTAL
BY
*Bacon & Thomas*
ATTORNEYS

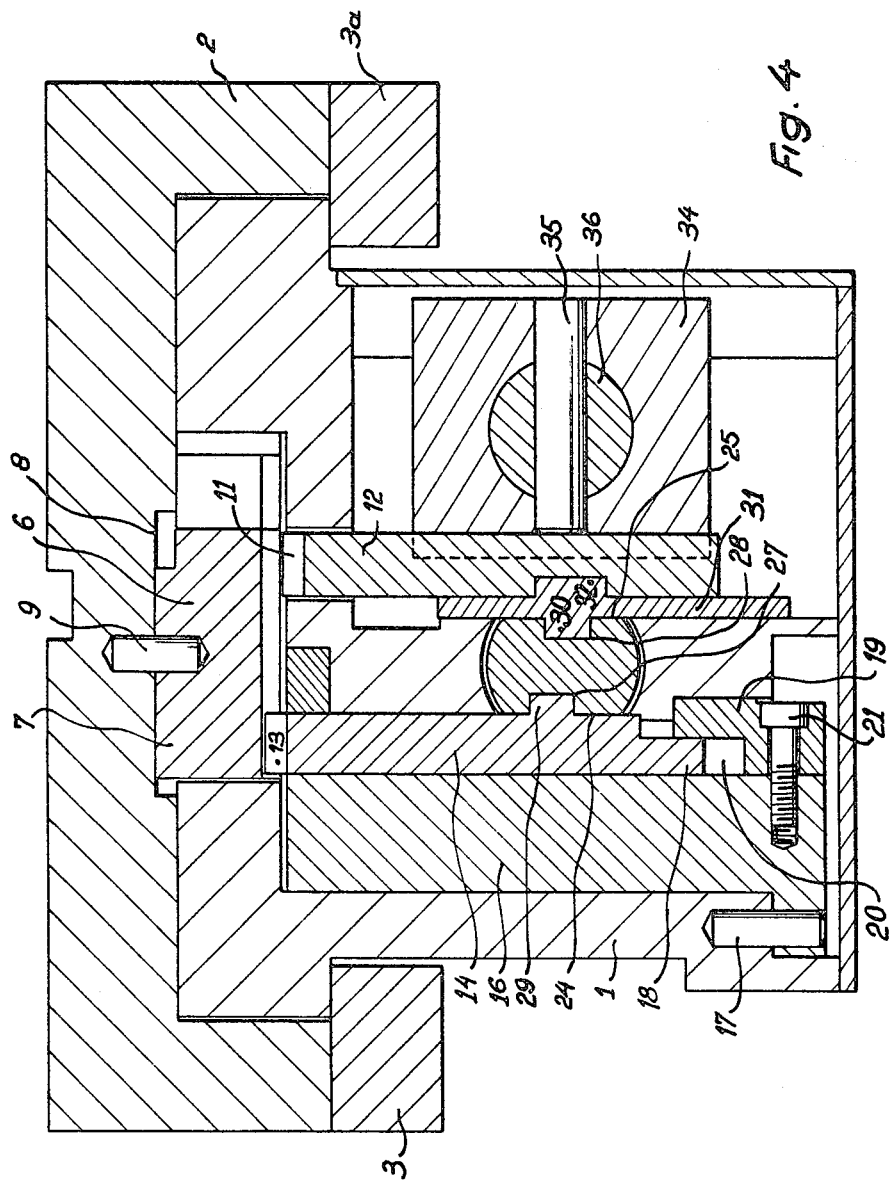

United States Patent Office 3,389,638
Patented June 25, 1968

3,389,638
LINEAR DIVIDER
Pierre Portal, Bologne, and Jacques Rouchard, Limoges, France, assignors to Commissariat à l'Energie Atomique, Paris, France
Filed Apr. 29, 1966, Ser. No. 546,452
4 Claims. (Cl. 90—56)

The present invention relates to a linear divider, particularly for a machine tool.

When machining certain work pieces on machine tools and in particular milling machines, it is sometimes necessary to use linear dividers which permit a step-by-step machining operation, in particular of grooves by means of milling cutters, in order to shape flanges on tubular heat exchanger components.

Modern machine tools call for a high rate of production, necessitating the utilisation of dividers which are entirely automatically, pneumatically or hydraulically controlled, and a high precision of machining necessitating that vibrations occurring during the machining operation and displacements of the part to be machined, be substantially eliminated between each machining cut all of which are strictly identical.

A divider according to the present invention enables these different problems to be solved and it comprises a sliding table whose step-by-step displacements are controlled by a driving pin engaging in a toothed rack secured to the table which is held in machining position by a locking pin engaged in said toothed rack.

The components for driving the pins are provided so that their engagement with the toothed rack is alternate, so as to release the locking pin when the driving pin is engaged with the toothed rack and vice versa.

The pins are controlled by means of an automatic compressed fluid control device which is controlled by an electromechanical or electronic control means in co-ordination with the different machining operations.

In accordance with the present invention, a table on which the part to be machined is fixed is mounted to slide on a frame, and comprises at one of its ends a toothed rack whose gearing co-operates with a driving pin and a locking pin, each having teeth adapted alternately to engage the toothed rack; said pins mounted to slide perpendicularly to the toothed rack, are connected by guiding members to a locking rod mounted to slide parallel to the table, in the frame; the driving pin itself also being secured to a drive rod sliding parallel to the table in the frame, by a yoke fixed at one of the ends of said rod, in which it is mounted to slide perpendicularly to the cable.

Figure 2:
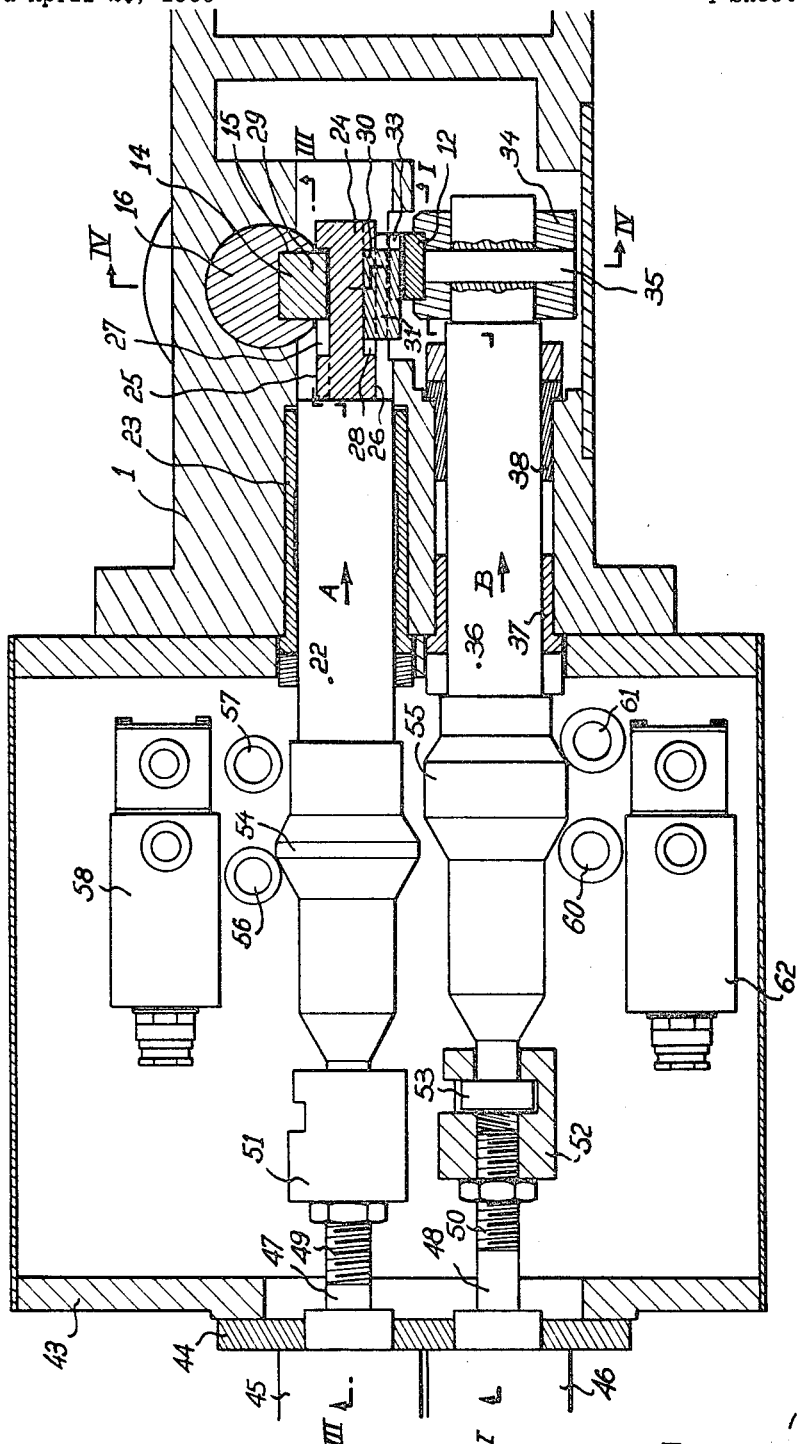
Figure 3:
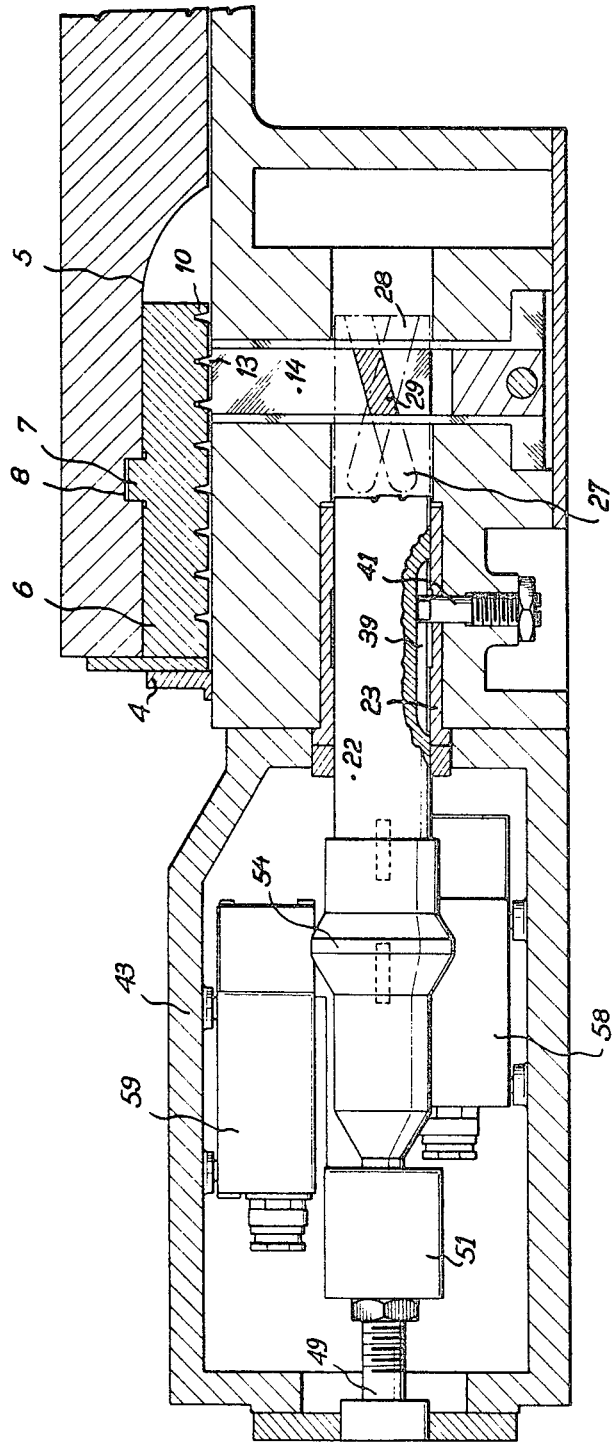

Other characteristics of the invention will appear from the following description of an embodiment given solely by way of non-limiting example, this description being given with reference to the accompanying drawings in which:

FIGURE 1 is an elevational view in section along the line I—I of FIGURE 2, of a linear divider according to the invention, FIGURE 2 is a plan view of the section along the line II—II of FIGURE 1, FIGURE 3 is an elevational sectional view along the line III—III of FIGURE 2, and FIGURE 4 is a transverse sectional view along the line IV—IV of FIGURE 2.

Referring now to the drawings, a linear divider according to the invention, shown in FIGURES 1 and 2, is constituted by a frame 1 on which a table 2 is mounted to slide, said table being held on the frame by guide bars 3 and 3a fixed to the table 2 (FIGURE 4).

A part to be machined can be mounted in a known manner on the table 2.

The longitudinal displacements of the table 2 are limited to the two ends of the frame 1, by stops such as 4, only one of which is shown and which are fixed to the frame 1.

At one of its ends, the table 2 has in its lower median part a housing 5 in which is engaged a toothed rack 6 positioned on the table 2 by a transverse rib 7 thereof, engaged in a groove 8 of the table 2 and by a pin 9 engaged respectively in the table 2 and the toothed rack 6. Said toothed rack 6 is fixed to the table in a known manner by countersunk screws (FIGURES 1, 2, 3 and 4).

The toothed rack 6 has teeth 10 which cooperates with teeth 11 of a driving pin 12 and teeth 13 of a locking pin 14, said pins being perpendicular to the axis of the toothed rack 6 and arranged in the frame 1 below the table 2.

The locking pin 14 is mounted to slide in a groove 15 of a cylindrical member 16 held on the frame 1 by a pin 17. The lower part 18 of the pin 14 is guided and held in a groove 20 of a part 19 fixed to the cylindrical part 16 by a hollow headed screw 21.

The driving and locking pins 12 and 14 are controlled, in their displacement perpendicular to the table 2, by a locking rod 22 sliding parallel to the table 2 in a bearing 23 fixed in the frame 1 and one end 24 of which has two plane vertical faces 25, 26 arranged parallel, in which rearwardly inclined grooves 27, 28 are made.

A boss 29 of the locking pin 14 is engaged in the groove 27 and a boss 30 of a tool-slide 31 which can be displaced perpendicularly to the toothed rack 6 is engaged in the groove 28. This tool-slide 31 carries a boss 32 on which the driving pin 12 is mounted to slide horizontally through a groove 33, said driving pin being held on the other hand in a yoke 36 with respect to which it may slide perpendicularly to the toothed rack 6. This yoke 34 is fixed by a spindle 35 to one of the ends of a drive rod 36 sliding parallel to the table 2, in bearings 37, 38 fixed in a cylindrical housing of the frame 1.

The locking rod 22 and driving rod 36 which slide parallel to one another, respectively have grooves 39, 40 in which are respectively engaged guiding pins 41, 42 fixed to the frame 1 in order to prevent any rotational movement of these rods.

The locking rods 23 and driving rods 36 extend beyond the frame 1 and beyond the side of the pins 12, 14, opposite their drive, in a casing 43 fixed to the frame 1. This casing 43 has on its side opposite where it is fixed to the frame 1, a closing plate 44 on which are secured pressurised fluid control cylinders 45, 46 enclosing pistons (not shown in the drawing), the rods 47, 48 of which have threaded ends 49, 50 on which are screwed yokes 51, 52 which are respectively coupled with the locking rods 22 and driving rods 36, the ends of which have stopping members such as 53 engaged in said yokes 51, 52.

In their median parts, each of the locking rods 22 and driving rods 36 comprises a circular boss 54, 55.

The boss 54 of the locking rod 22 is adapted to contact rollers 56, 57 of micro-contacts 58, 59 secured to the casing 43 and controlling two electro valves (not shown in the drawing).

The boss 55 of the locking rod 36 is adapted to contact rollers 60, 61 of micro-contacts such as 62, controlling electrically-operated valves.

The linear divider is shown in FIGURES 1, 2, 3 and 4 in the machining position, when the locking pin 14 is engaged by its teeth 13 in the teeth 10 of the toothed rack 6 and when the table 2 is fixed. In order to displace the table 2 by one division in a step-by-step manner, in order to proceed with another machining operation, the locking rod 22, actuated by the piston of the cylinder 45, advances in the direction of the arrow A and drives, by its groove 27, the boss 29 secured to the locking pin 14 which descends and is thus disengaged from the toothed rack 6.

Simultaneously, the rod 22, by its groove 28, drives the boss 30 of the tool guide 31 which, by its boss 32 on which the pin 12 is mounted by a groove 33, lifts this latter in order to engage its teeth 11 with the teeth 19 of the toothed rack 6.

At the end of its course, the rod 22 acts by its circular boss 54 on the roller 57 of the micro-contact which for its turn acts on one of the electrically-operated valves for controlling the piston disposed in the cylinder 46 which controls the advance movement in the direction of the arrow B of the driving rod 36. In its advance movement, the rod 36 by its yoke 34 acts on the driving pin 12 which slides by its groove 33 on the boss 32 of the tool-slide; said pin 12 being engaged in the toothed rack 6 as described above, it drives the table 2 by a predetermined distance corresponding to the pitch of the advance movement.

At the end of the travel of the driving rod 36, the circular boss 55 acts on the roller 61 of the micro-contact which actuates one of the valves for controlling the piston arranged in the cylinder 45 and for driving the locking rod 22 in the direction opposite that of arrow A.

This recoil movement of the locking rod 22 causes, in the same manner as described above, by its grooves 27, 28 and inversely, the disengagement of the drive rod 12 and the engagement of the locking rod 14 with the toothed rack 6.

As soon as the locking rod 22 comes into contact by its boss 54 with the roller 56 of the micro-contact, the latter acts on one of the valves which control the return of the drive rod 36.

In its movement opposite the direction of the arrow B, the rod 36 acts on the drive pin 12 which is in low position and cannot drive the table 2.

The pin 12 is thus returned to its initial position where it is ready to effect the following division.

The boss 55 comes into contact with the roller 60 of the micro-contact at the end of the travel of the drive rod 36 and can control by its valve the continuance of the machining operations of the machine.

We claim:

1. A linear divider particularly for a machine tool, comprising a table arranged to receive a part to be machined, a frame, means for sliding said table in said frame, a toothed rack at one end of said table, said rack having teeth co-operable with a driving pin and a locking pin, each of said pins having teeth adapted alternately to engage said toothed rack; said pins being mounted to slide perpendicularly to said toothed rack, and being connected by guide members to a locking rod mounted to slide parallel to said table in said frame, said drive pin itself also being secured to a drive rod sliding parallel to said table in said frame, by a yoke fixed at one of the ends of said rod in which it is mounted to slide perpendicularly to said table.

2. A linear divider according to claim 1, wherein the members for guiding said pins on said locking rod are constituted by two rearwardly inclined grooves formed on two vertical surfaces of said locking rod, in which are mounted two rearwardly inclined bosses which are respectively secured to said locking pin and a tool-slide which has a second boss on which said driving pin is mounted to slide horizontally, said driving pin having a groove in which said boss is engaged.

3. A linear divider according to claim 1, wherein said drive rod and said locking rod are secured at their opposite ends connected to said driving pin and said locking pin, with pistons controlled by a compressed fluid whose admission into cylinders of said pistons is controlled by electrically-operable valves.

4. A linear divider according to claim 3, wherein in their median part, said drive rod and said locking rod have circular bosses adapted to contact rollers of micro-contacts controlling said electrically-operable valves.

References Cited

UNITED STATES PATENTS

| | | | |
|---|---|---|---|
| 2,249,898 | 7/1941 | Harley et al. | 90—57 |
| 2,763,191 | 9/1956 | Wells | 90—58 |

LEONIDAS VLACHOS, *Primary Examiner.*